United States Patent
Oba et al.

(10) Patent No.: US 6,974,143 B2
(45) Date of Patent: Dec. 13, 2005

(54) HYDRAULIC SHOCK ABSORBER FOR VEHICLE

(75) Inventors: Shinichi Oba, Shizuoka (JP); Tomoya Toda, Shizuoka (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/613,705

(22) Filed: Jul. 3, 2003

(65) Prior Publication Data

US 2005/0000770 A1    Jan. 6, 2005

(51) Int. Cl.$^7$ ............................................. B62K 25/08
(52) U.S. Cl. ........................................ 280/276; 267/221
(58) Field of Search ................................ 188/280, 316, 188/322.16, 322.18, 322.5

(56) References Cited

U.S. PATENT DOCUMENTS

| | | | |
|---|---|---|---|
| 3,236,339 A | * | 2/1966 | Arthur ........................ 188/320 |
| 3,536,170 A | * | 10/1970 | Bell et al. .................... 188/281 |
| 4,934,667 A | * | 6/1990 | Pees et al. ............... 267/64.21 |
| 4,964,625 A | * | 10/1990 | Kawamura ................ 267/221 |
| 5,148,897 A | * | 9/1992 | Vanroye ................. 188/322.22 |
| 5,154,263 A | * | 10/1992 | Lizell ....................... 188/266.2 |
| 5,198,285 A | * | 3/1993 | Arai et al. .................... 428/216 |
| 5,328,196 A | * | 7/1994 | Ohma ......................... 280/276 |
| 5,346,236 A | * | 9/1994 | Ohma ......................... 280/276 |
| 5,417,446 A | * | 5/1995 | Pileggi ....................... 280/276 |
| 5,725,226 A | * | 3/1998 | Cabrerizo-Pariente ...... 280/276 |
| 6,260,832 B1 | * | 7/2001 | Vignocchi et al. ....... 267/64.15 |
| 6,371,263 B1 | * | 4/2002 | Hoose ......................... 188/312 |
| 6,520,524 B1 | * | 2/2003 | Costa .......................... 280/276 |
| 6,640,541 B2 | * | 11/2003 | Winkelmann et al. ......... 60/533 |
| 2004/0163908 A1 | * | 8/2004 | Wada .................... 188/322.12 |

FOREIGN PATENT DOCUMENTS

JP          2001214269     *   7/2001

* cited by examiner

Primary Examiner—Chris Schwartz

(57) ABSTRACT

In a hydraulic shock absorber for a vehicle in which a slide pipe is slidably provided within a cylinder tube, and a working fluid chamber is provided within the cylinder tube and the slide pipe, a guide bush coated with a polytetrafluoroethylene and an oil seal sealing the fluid chamber are provided in an inner periphery of the cylinder tube so as to be in slide contact with an outer periphery of the slide pipe. An amorphous hard carbon film is formed on the outer peripheral surface of the slide pipe.

6 Claims, 9 Drawing Sheets

DEPTH PROFILE OF DLC

HYDRAULIC SHOCK ABSORBER FOR VEHICLE

BACKGROUND OF THE INVENTION

1. Field of the Invention

The present invention relates to a hydraulic shock absorber for a vehicle, such as a front fork, a rear damper or the like of a motorcycle or the like.

2. Description of the Related Art

In a front fork of a motorcycle, there have been structures in which wear resistance and low-frictional resistance are improved by forming a hard film of TiN or TiO compound on a surface of a slide pipe slidably provided within a cylinder tube in accordance with a dry plating such as an HCD method, a PVD method, a PVCD method or the like. The structure is used in a road racer, an off road racer, a mass production motorcycle or the like. In this case, a surface of the TiN film has a gold color, and a surface of the TiO film has a blue color, a green color or a brown color in correspondence to an amount of contained oxygen.

Since the front fork of the motorcycle is mounted to the body with a caster angle, a side force applied from a road surface is transmitted in the front fork. This side force is applied to a guide bush provided in an inner periphery of an opening portion in a cylinder tube of the front fork, and a guide bush provided in an outer periphery of a leading end portion in the slide pipe.

When the motorcycle travels on a flat straight road surface of the like, vibration input from the road surface is small, so that only a small side force is applied to the slide pipe. Further, when traveling on the flat straight road surface or the like, the slide pipe is driven with respect to the cylinder tube at a low speed.

On the contrary, when the motorcycle travels on a rough road surface or the like having great irregularity, substantial vibration is input from the road surface, so that a great side force is applied to the slide pipe. Further, when traveling on a rough road surface or the like having great irregularity, the slide pipe is driven at a high speed.

However, in the conventional slide pipe on which the TiN or the TiO is coated, since frictional resistance with respect to a guide bush and an oil seal fixed to the opening portion of the cylinder tube is small, when the front fork is driven at a low speed such as when traveling on a flat straight road surface or the like, wasteful motions may be generated in the slide pipe and the road holding property of the tire is deteriorated. On the contrary, when passing through a rough road surface or the like having great irregularity, the friction may be great, and the motion of the slide pipe is slow, that is, a road surface following property of the tire is deteriorated.

In this case, recently, there has been disclosed, for example, in Japanese Patent Application Laid-Open No. 2001-214269, a technique of coating an amorphous hard carbon film (called as DLC (Diamond Like Carbon) film) on a metal base plate of a sliding part used in an automobile or the like. However, in the prior art, there is nothing which suggests the problems mentioned above with regard to the motion of the slide pipe peculiar to the hydraulic shock absorber for a vehicle such as the front fork or the like, and there is disclosed nothing relating to forming the DLC film on the slide member of the hydraulic shock absorber for a vehicle.

SUMMARY OF THE INVENTION

An object of the present invention is to improve road holding properties during low speed operation, and to improve road surface following properties during high speed operation, in a hydraulic shock absorber for a vehicle.

The present invention relate to a hydraulic shock absorber for a vehicle, comprising: a slide member slidably provided within a cylinder tube and a working fluid chamber provided within the cylinder tube and the slide member. A guide bush coated with a polytetrafluoroethylene and an oil seal sealing the fluid chamber are provided in an inner periphery of the cylinder tube so as to be in slide contact with an outer peripheral surface of the slide member. An amorphous hard carbon film is formed on the outer peripheral surface of the slide member.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
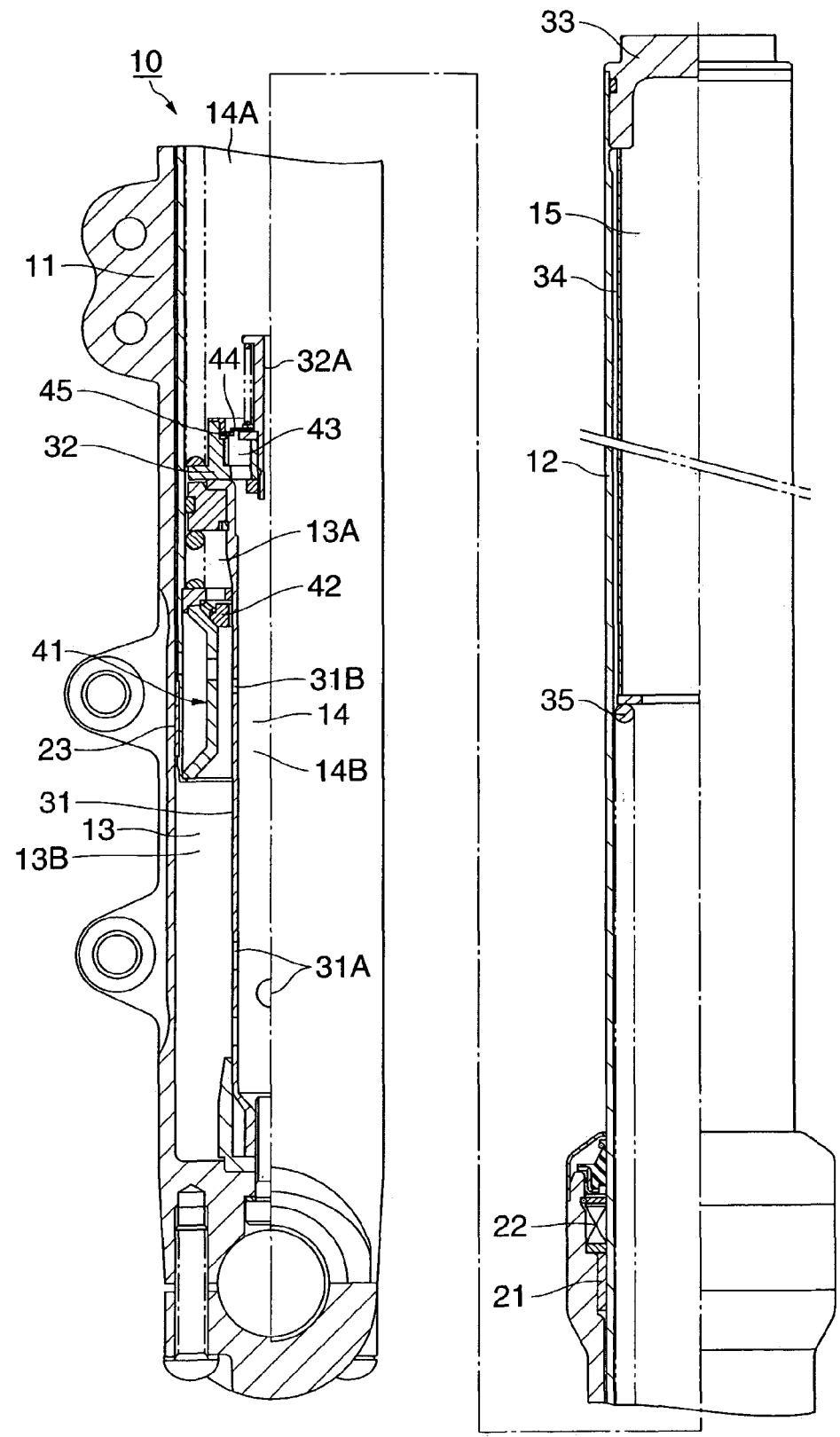
FIG. 1 is a sectional view showing a hydraulic shock absorber.

A hydraulic shock absorber 10 in FIG. 1 is a front fork of a motorcycle, which is slidably provided with a slide pipe 12 in an inner portion of a cylinder tube 11, and is provided with a working fluid chamber 13 which may include an upper oil chamber 13A and a lower oil chamber 13B, an oil storage chamber 14 which may include an upper oil storage chamber 14A and a lower oil storage chamber 14B, and a gas chamber 15, in an inner portion of the cylinder tube 11 and the slide pipe 12.

The hydraulic shock absorber 10 is provided with a guide bush 21 which is in slide contact with an outer peripheral surface of the slide pipe 12 and is coated by a polytetrafluoroethylene (Teflon (registered trademark)). A nitrile rubber oil seal 22 seals the oil chamber 13, in an inner periphery of the opening portion of the cylinder tube 11. Further, the hydraulic shock absorber 10 is provided with a guide bush 23 which is in slide contact with an inner peripheral surface of the cylinder tube 11 and is coated by a polytetrafluoroethylene, in an outer periphery of a leading end portion of the slide pipe 12.

The hydraulic shock absorber 10 has a suspension spring 35 interposed between a partition wall member 32 provided in an upper end portion of a hollow pipe 31 rising from a bottom portion of the cylinder tube 11, and a collar 34 backed up by a cap 33 provided in an upper end portion of the slide pipe 12.

The hydraulic shock absorber 10 absorbs and reduces an impact applied to the vehicle by the suspension spring 35 and an air spring of the gas chamber 15, and damps vibration of the suspension spring 35 generated in correspondence to the absorption of the impact on the basis of the following attenuation effect.

The hydraulic shock absorber 10 is structured such that in a compression stroke, the slide pipe 12 moves downward from an extended state in FIG. 1 and pressure in a lower oil chamber 27B is increased. A check valve 42 of a piston 41 provided in the slide pipe 12 moves upward so as to be opened and the fluid in the slide pipe 12 at an amount of cross sectional area×number of strokes moves to the lower oil storage chamber 14B via a through hole 31A of the hollow pipe 31 from the lower oil chamber 13B. Also, the oil in the lower oil chamber 13B is replaced by a side of the upper oil chamber 13A. Further, when the oil moving to the lower oil storage chamber 14B moves to the upper oil storage chamber 14A, an attenuation force is generated on the basis of a center hole 32A of the partition wall member 32, a minute gap between a flexible valve 44 of an expansion pressure common flow passage 43 and a check valve 45, and a deflection of the flexible valve 44.

In an extension stroke of the hydraulic shock absorber 10, the slide pipe 12 is expanded from a compressed state and pressure in the upper oil chamber 13A is increased, whereby an attenuation force is generated caused by a passage resistance generated in an annular gap of the check valve 42 when the oil in the upper oil chamber 13A moves to the lower oil chamber 13B from the annular gap of the check valve 42 seated on an upper taper portion of the piston 41, and a passage resistance generated in an orifice 31B of the hollow pipe 31 when the oil in the upper oil chamber 13A goes out of the orifice 31B and moves to the lower oil chamber 13B via the lower oil storage chamber 14A and the through hole 31A of the hollow pipe 31. Further, in this extension stroke, the oil in an amount equal to the cross sectional area×number of strokes in the slide pipe 12 is supplied to the lower oil chamber 13B from the upper oil storage chamber 14A via the lower oil storage chamber 14B. At this time, the oil in the upper oil storage chamber 14A passes through the center hole 32A of the partition wall member 32, and further opens the check valve 45 so as to move to the lower oil storage chamber 14B.

Accordingly, in the hydraulic shock absorber 10, an amorphous hard carbon film (DLC film) is formed on an outer peripheral surface of the slide pipe 12 in the following manner.

Figure 2:
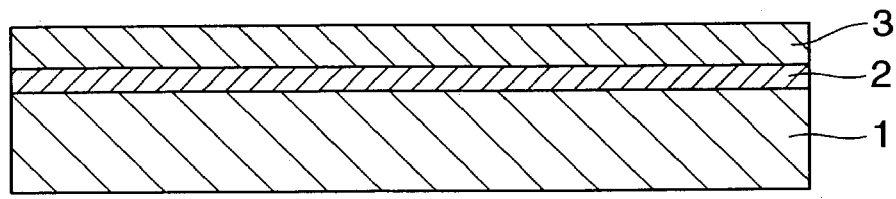
FIG. 2 is a sectional view showing a coating layer formed on a slide pipe.
Figure 3:
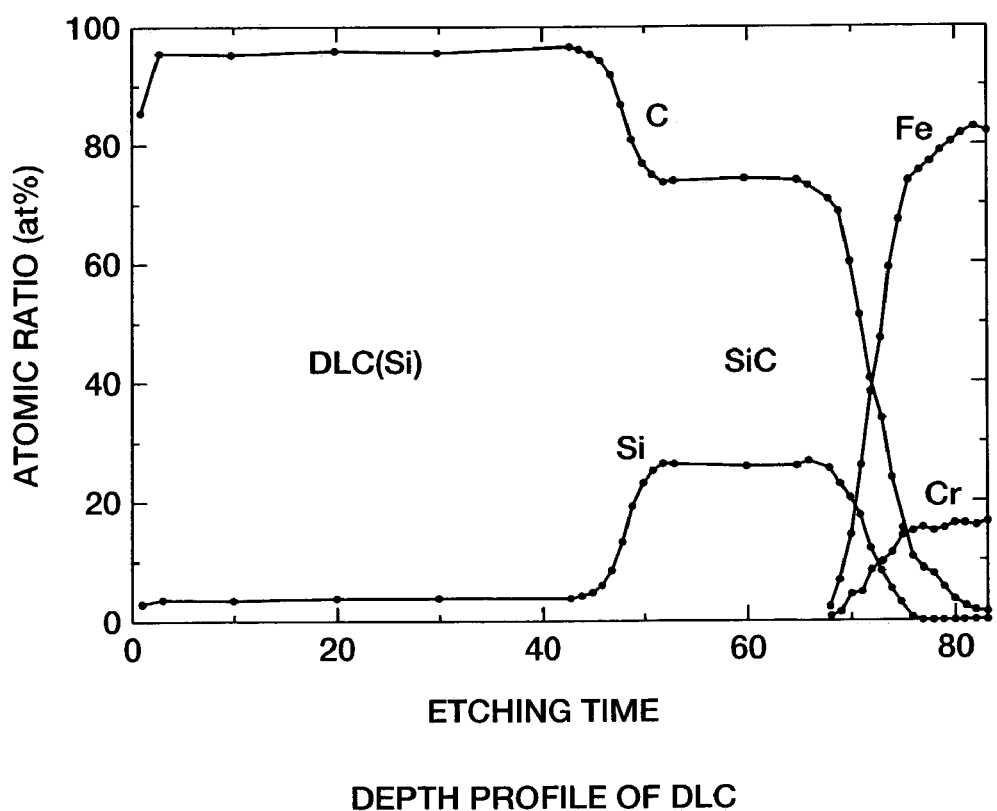
FIG. 3 is a diagram showing a depth profile of the coating layer formed on the slide pipe.

An intermediate layer 2 made of SiC containing 30% Si is provided on an outer peripheral surface of a slide pipe raw pipe 1 such as a steel pipe for machine structural use containing Fe, Cr or the like, for improving an adhesion with the slide pipe raw pipe 1, and a DLC film 3 containing 5% Si and having a film thickness of 2 to 3 $\mu$m is formed on the intermediate layer 2, in accordance with a PCVD method, as shown in FIG. 2. In this case, the film thickness of the DLC film 3 may be within a range between 1 and 5 $\mu$m. Si of the DLC film 3 is contained for lowering internal stress. FIG. 3 shows a composition in each of component parts in a depth direction obtained by etching the slide pipe raw pipe 1, the intermediate layer 2 and the DLC film 3 from the surface (DLC film 3).

In this case, a method of forming the intermediate layer 2 and the DLC film 3 with respect to the slide pipe raw pipe 1 (the PCVD method) includes applying an electric discharge cleaning caused by a plasma of an argon gas and a hydrogen gas to the raw pipe 1 arranged in a vacuum deposition chamber in a state of applying an asymmetric pulse voltage, forming the intermediate layer 2 made of SiC on the raw pipe 1 by introducing a tetramethylsilane gas, and forming the DLC film 3 containing Si by introducing a hydrocarbon group gas in addition to the tetramethylsilane gas.

In this case, during low speed operation of the slide pipe 12 such as when traveling on a flat straight road surface or the like, it is required that the slide pipe 12 does not move too much and the road holding property of the tire is good. Further, during high speed operation of the slide pipe 12 such as when traveling on a rough road surface having great irregularity or the like, it is required that the slide pipe 12 moves well and the road surface following property of the tire is good.

Then, a friction property is compared and analyzed in the following aspects (A) to (C) with regard to the hydraulic shock absorber 10, with respect to a structure using the slide pipe 12 in which the DLC film 3 is formed in the manner mentioned above, and a structure using the slide pipe 12 in which a TiN film or a TiO film is formed.

(A) Oil Seal Friction Test

When a motorcycle travels on a flat straight road surface or the like, not too much side force is generated in the hydraulic shock absorber 10 on the basis of the vibration input from the road surface. With respect to the friction applied to the slide pipe 12, the friction generated in the oil seal 22 is greater than the friction generated in the guide bush 21.

Consequently, where the operating speed of the slide pipe 12 in the hydraulic shock absorber 10 (in other words, a piston speed VP) is, for example, equal to or less than 0.1 m/sec, an oil seal friction tester 50 is used. Results in FIG. 6 are obtained by measuring friction generated between the slide pipe 12 and a lip 22A of the oil seal 22, during low speed operation of the slide pipe 12.

Figure 4:
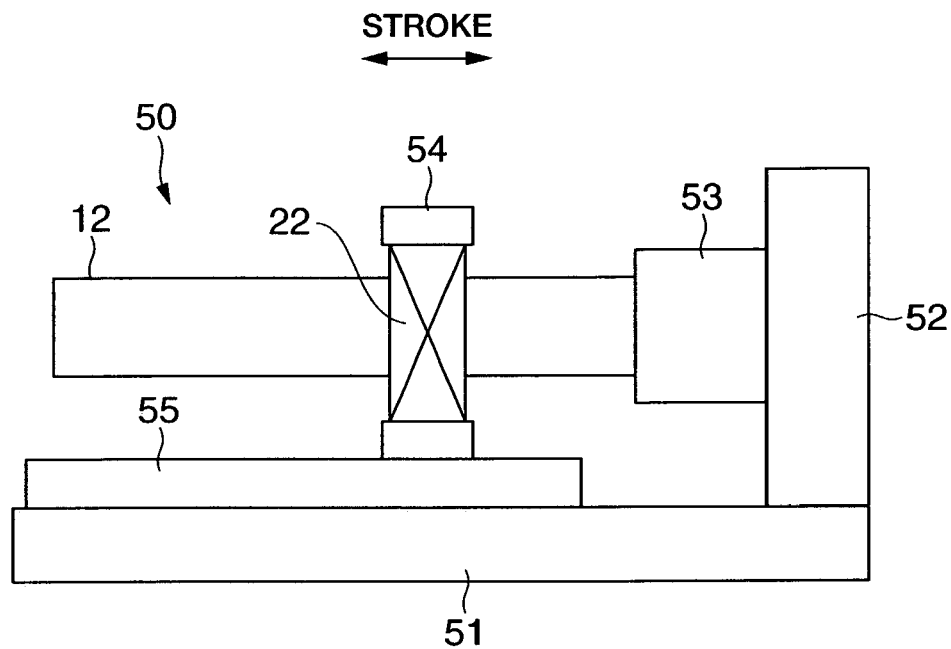
FIG. 4 is a view showing an oil seal friction tester.
Figure 5:
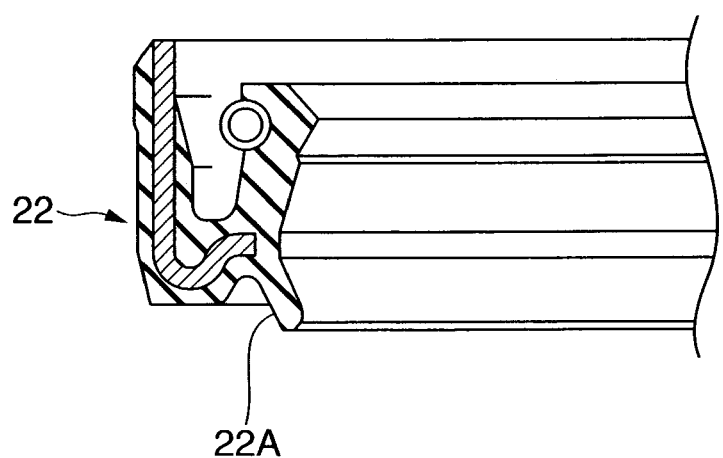
FIG. 5 is a sectional view showing an oil seal.

The oil seal friction tester 50 is structured, as shown in FIG. 4, such that one end of the slide pipe 12 is fixed to a column 52 fixed to one end of a base 51 via a load cell 53. The oil seal 22 is fitted to an outer periphery of the slide pipe 12. An outer periphery of the oil seal 22 is clamped by a half clamp jig 54, and the clamp jig 54 is fixed onto a slide table 55. A load during sliding the oil seal 22 is measured by moving the slide table 55 in an axial direction of the slide pipe 12 by a linear motor or the like (not shown). In this case, a working fluid is applied to an outer periphery of the lip 22A of the oil seal 22. In this case, a working fluid having a kinematic viscosity 15.5 to 18.5 cSt at a temperature of 40° C. and a viscosity index 156 is used as the working fluid.

In this case, the slide pipe 12 has an outer diameter of 43 mm, and the oil seal 22 is made of A160 (nitrile rubber) manufactured by NOK CORPORATION. A moving stroke of the oil seal 22 by the oil seal friction tester 50 is set to 100 mm. The working speed of the slide pipe 12 is set within a low speed operation range between 0.01 m/sec and 0.1 m/sec, and an acceleration and deceleration time (a time required for acceleration and deceleration) is set to 10 msec, respectively.

Figure 6:
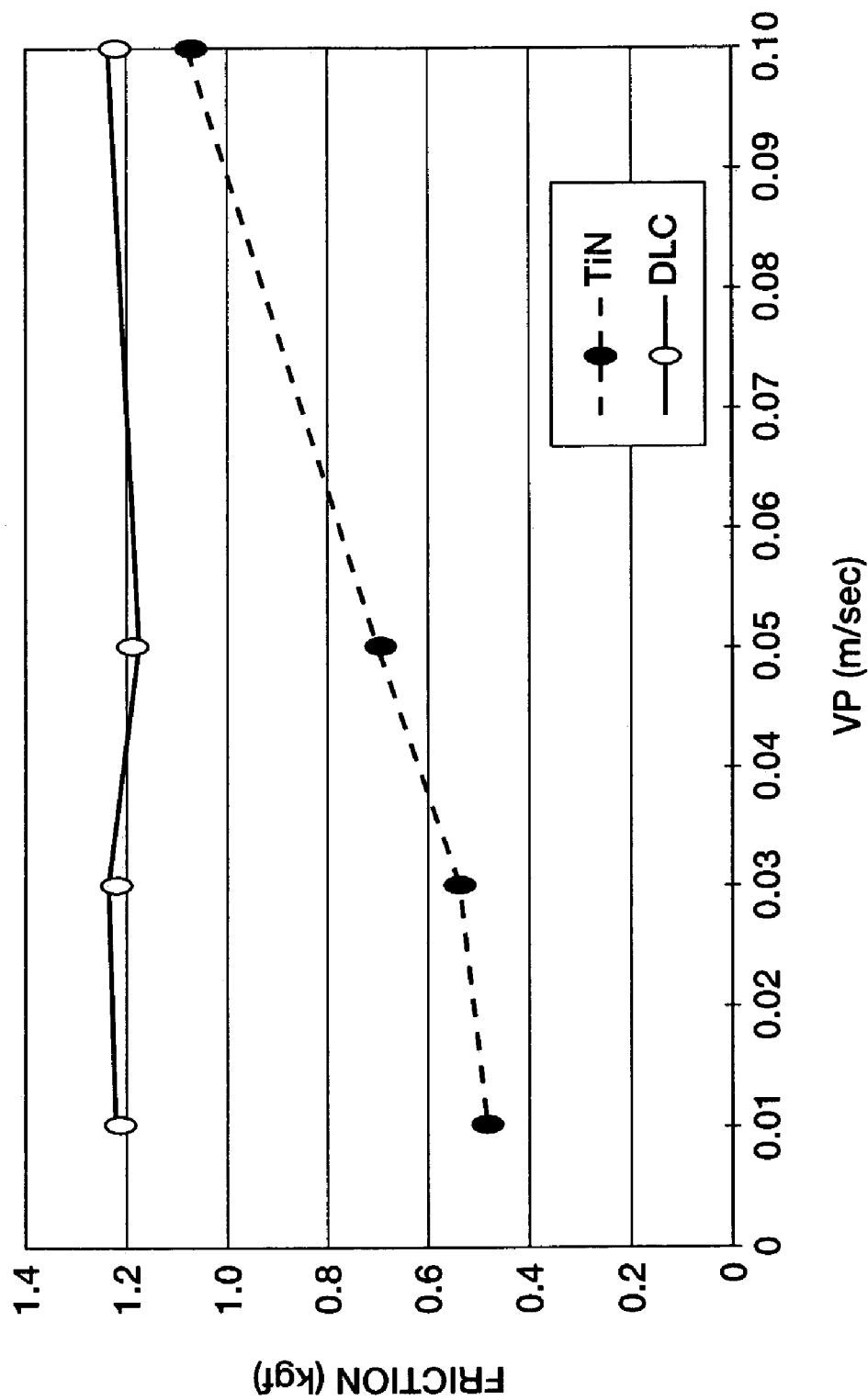
FIG. 6 is a diagram showing an oil seal friction property.

As shown in the results of FIG. 6, the absolute value of friction in the slide pipe 12 coated with the DLC film 3 shown by a solid line registers a greater value than that coated with the TiN film shown by a broken line, in all the area of the low speed operation range from 0.01 m/sec to 0.1 m/sec measured by the present tester. The difference becomes greater with respect to the structure coated with the TiN film in accordance with the structure being closer to the low speed side.

It is considered that the friction in the slide pipe 12 formed with the DLC film 3 is great in the low speed operation range between 0.01 m/sec and 0.1 m/sec because an oil film holding surface on the outer peripheral surface of the DLC film 3 is small. That is, it is considered that this is because the DLC film 3 has no grain boundary due to a dense amorphous structure, the surface thereof is very smooth, and an area of an irregular surface for holding the oil film is very small. In this connection, an average roughness of the DLC film surface is Ra=7.3 Å, and an average roughness of the TiN film is Ra=113 Å.

Further, as shown in the results of FIG. 6, in the slide pipe 12 coated with the TiN film, in accordance that the sliding speed in the low speed operation range from 0.01 m/sec to 0.1 m/sec or less becomes high, the friction becomes great such as from 0.5 kgf to 1.1 kgf, and the friction becomes high in proportion to the operating speed. It is considered that a speed dependency of the friction in the low speed operation range of the slide pipe 12 formed with the TiN film is caused by a change in sliding area of the slide pipe 12 and the oil seal 22 applied by the piston speed, a change in the oil film holding state and the like. However, this has not been yet completely clarified. On the contrary, in the slide pipe 12 formed with the DLC film 3, the friction is fixed approximately near 1.2 kgf irrespective of the sliding speed, in the low speed operation range from 0.01 m/sec to 0.1 m/sec. This is because in the slide pipe 12 formed with the DLC film 3, the friction in the low speed operation range has no speed dependency.

As shown by the results of oil seal friction test mentioned above, the absolute value of the friction of the slide pipe 12 formed with the DLC film 3 in the low speed range is greater than that of the slide pipe covered by the TiN film. Accordingly, in the hydraulic shock absorber 10, in the low speed operation range equal to or less than 0.1 m/sec, there appears a result that wasteful motion of the slide pipe 12 is lost. No wasteful motion of the slide pipe 12 means a good road holding feeling of the tire and an improvement in driving stability.

(B) Guide Bush Friction Test

Next, at a time of a high speed operation of the slide pipe 12 such as when the motorcycle travels on a rough road surface or the like having significant irregularity, a great side force is applied to the hydraulic shock absorber 10 on the basis of the great vibration input caused by an upthrow from the road surface or the like. With respect to the friction applied to the slide pipe 12, the friction generated in the guide bush 21 is larger than the friction generated in the oil seal 22.

Figure 9A:
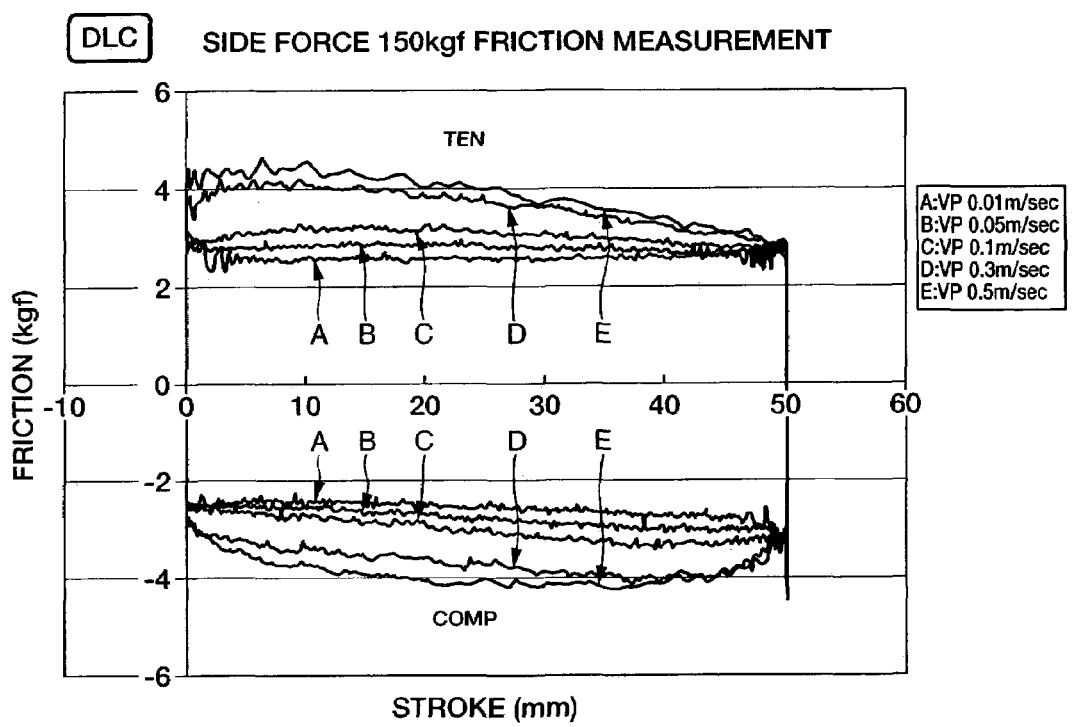
FIGS. 9A and 9B are diagrams showing a guide bush friction property.
Figure 9B:
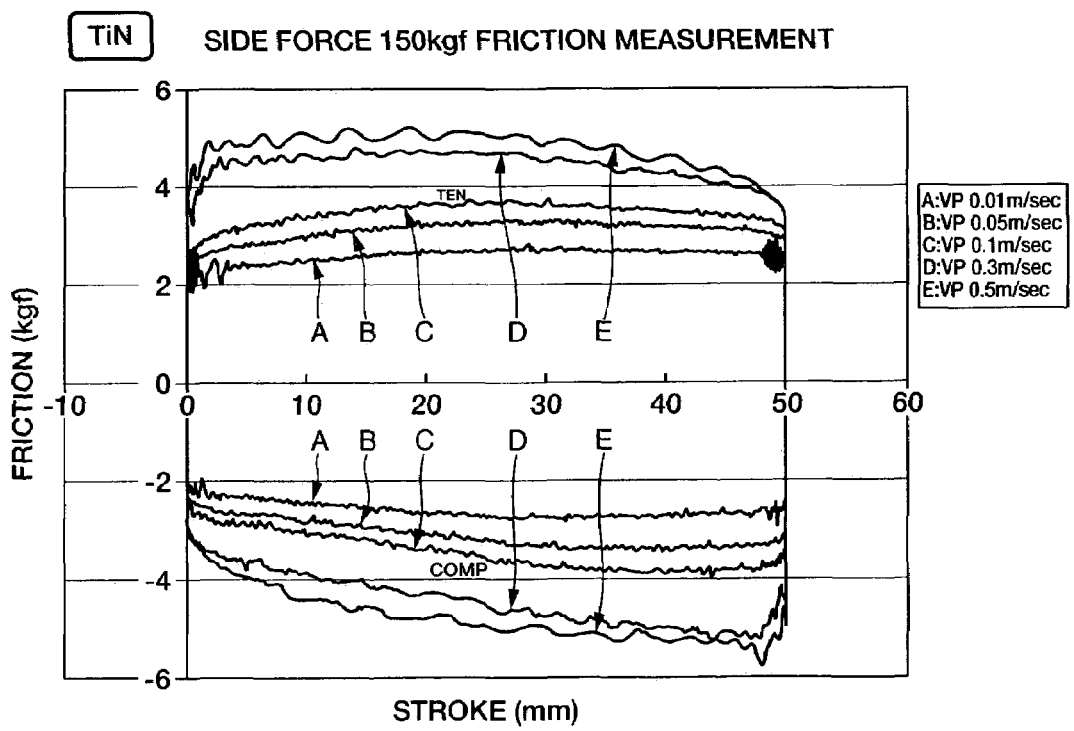

Consequently, in a case that the operating speed of the slide pipe 12 in the hydraulic shock absorber 10 is, for example, more than 0.1 m/sec, a crank type guide bush friction tester 60 is used. Friction generated between the slide pipe 12 and the guide bush 21 is measured thereby. Here, in the case that the operating speed of the slide pipe 12 in the hydraulic shock absorber 10 is equal to or less than 0.1 m/sec, the friction generated between the slide pipe 12 and the guide bush 21 is measured by using the oil seal friction tester 50 mentioned above. The reciprocating type friction tester 50 driven by the linear motor is used in the low speed range, because a fixed speed can be obtained irrespective of the stroke position of the slide pipe 12. The friction of the oil seal at a time of being switched between the extension stroke and the compression stroke can be accurately obtained due to a triangular wave input. On the contrary, in the crank type guide bush friction tester 60, since a circular motion is converted into a reciprocating motion by the crank, the speed of the slide pipe 12 is not fixed in correspondence to the stroke position of the slide pipe 12, and the friction of the oil seal at a time of being switched between the extension stroke and the compression stroke can not be accurately obtained due to a sine wave input. Therefore, results shown in FIGS. 9A and 9B are obtained in an expansion side (TEN side) and a compression side (COMP side) of the hydraulic shock absorber 10, respectively. FIG. 9A relates to the results using the DLC film 3, and FIG. 9B relates to the results using the TiN film. Further, in the friction in each of the speeds in FIGS. 9A and 9B, digitalization of peak values, that is, values when the speed of the slide pipe is at the maximum (the position of the stroke 25 mm in FIGS. 9A and 9B) is shown in Tables 1 and 2.

TABLE 1

| TEN side Vp m/sec | DLC film | Friction kgf TiN film |
|---|---|---|
| 0.01 | 2.6 | 2.7 |
| 0.05 | 2.8 | 3.3 |
| 0.1 | 3.1 | 3.7 |
| 0.3 | 3.7 | 4.7 |
| 0.5 | 4.0 | 5.1 |

TABLE 2

| COMP side Vp m/sec | DLC film | Friction kgf TiN film |
|---|---|---|
| 0.01 | 2.6 | 2.8 |
| 0.05 | 2.8 | 3.2 |
| 0.1 | 3.0 | 3.6 |
| 0.3 | 3.7 | 4.5 |
| 0.5 | 4.0 | 4.9 |

Figure 13A:
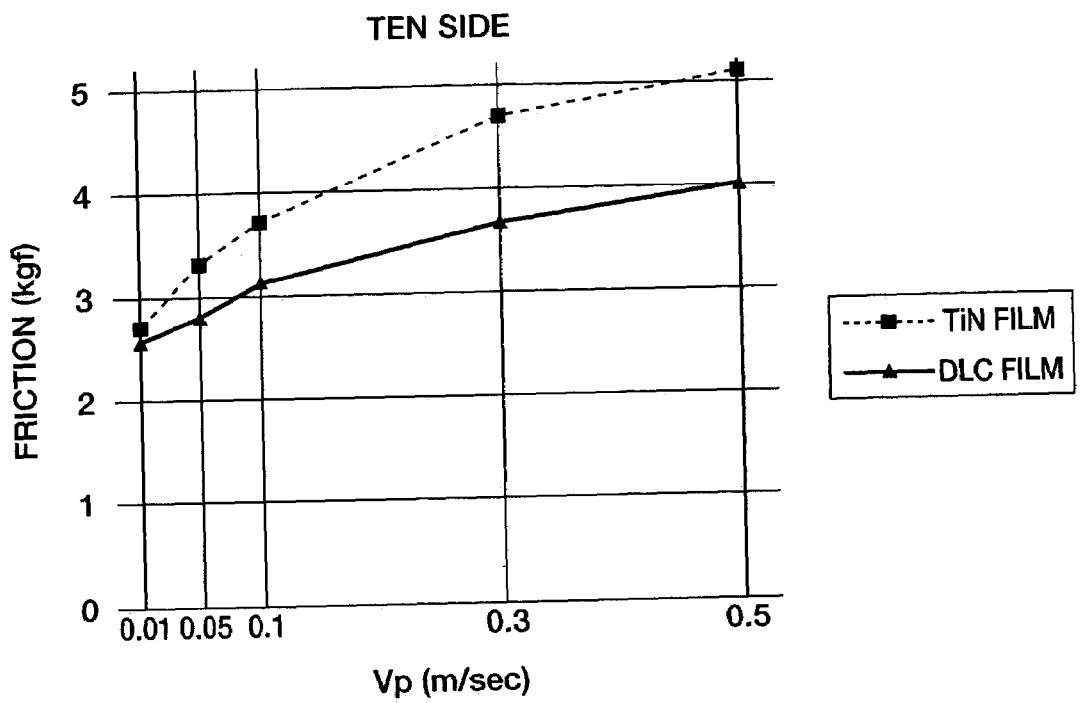
FIGS. 13A and 13B are diagrams showing the relation between a slide pipe operation speed and the friction.
Figure 13B:
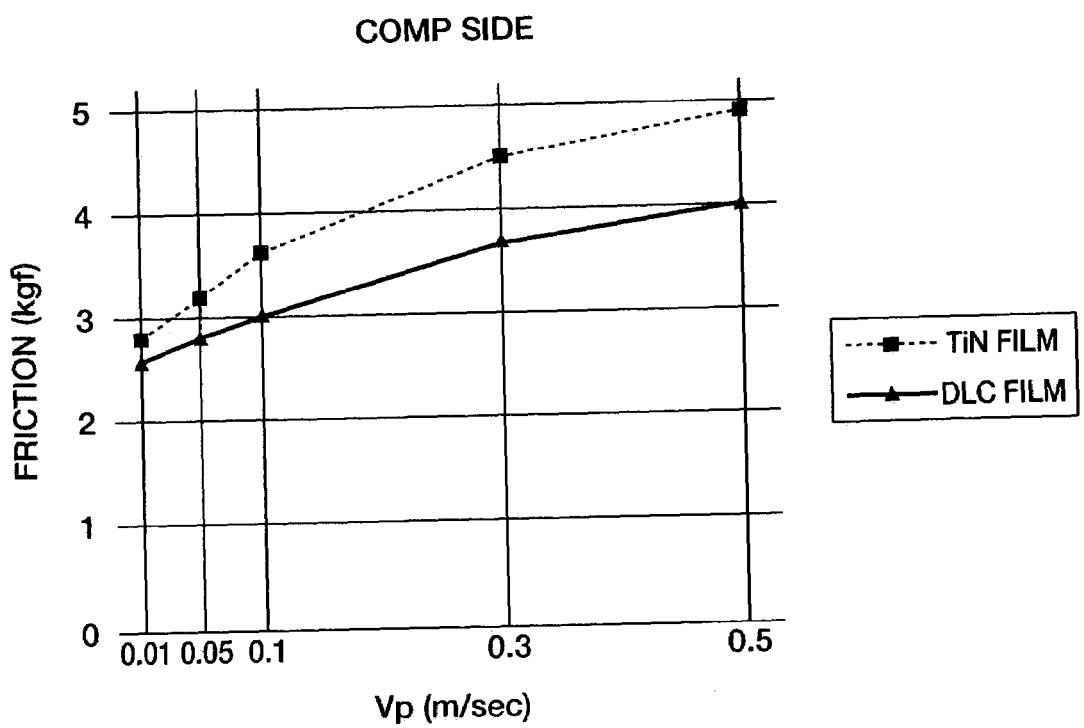

Further, graphic representation of the friction in Tables 1 and 2 is shown in FIGS. 13A and 13B.

Figure 7:
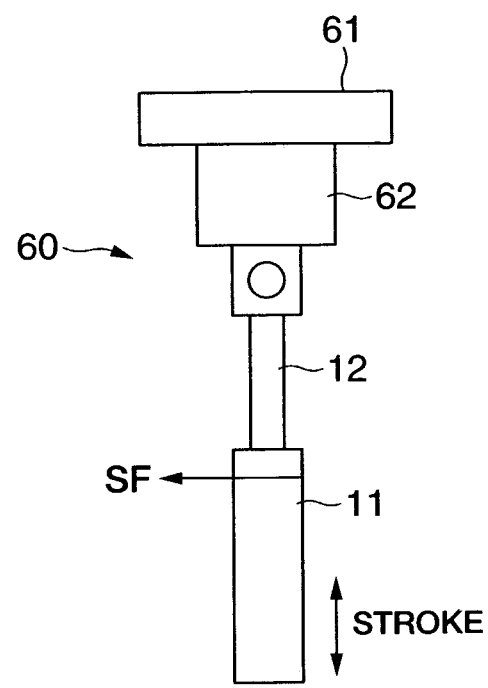
FIG. 7 is a view showing a guide bush friction tester.

The guide bush friction tester 60 is structured, as shown in FIG. 7, such that the upper end of the slide pipe 12 constructing the hydraulic shock absorber 10 is fixed to a base 61 via a load cell 62. In a state in which the cylinder tube 11 can be moved in an axial direction by connecting a crank motion apparatus (not shown) to the lower end of the cylinder tube 11, a side force SF is applied to the upper end of the cylinder tube 11.

Figure 8A:
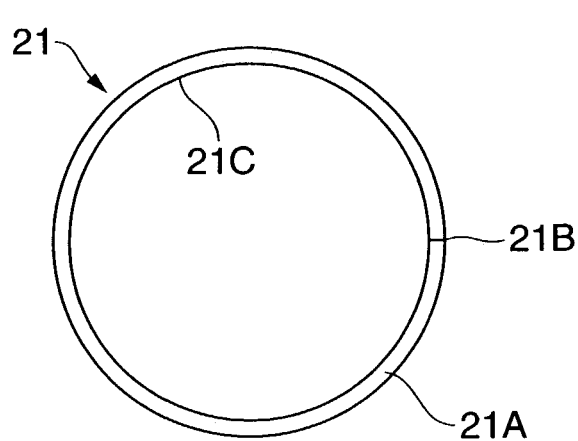
FIG. 8A is a plane view of a guide bush.
Figure 8B:
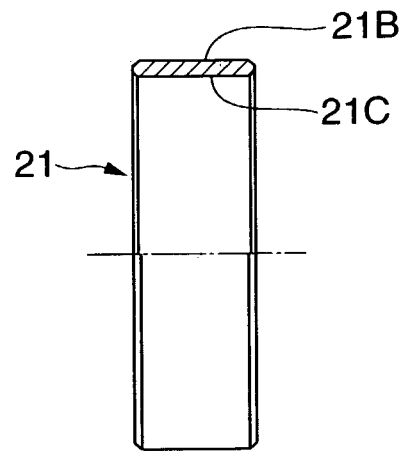
FIG. 8B is a half-sectional view thereof.

In this case, the slide pipe 12 is structured such as to have an outer diameter of 43 mm which is the same as the oil seal friction tester. The guide bush 21 is structured such that a Teflon (registered trademark) (polytetrafluoroethylene) 21C is coated on a surface of a copper group powder alloy provided on an inner periphery of a cylindrical steel plate (5 mm width) having an overlap 21B, as shown in FIGS. 8A and 8B. A vertical stroke of the cylinder tube 11 by the tester 60 is set to 50 mm, and the side force applied to the upper end portion of the cylinder tube 11 is set to 150 kgf.

As shown in the friction (the peak value) in the TEN side in Table 1, the friction in the slide pipe 12 coated with the DLC film 3 reads a value smaller than that of the slide pipe 12 coated with the TiN film. The difference becomes greater with respect to the structure coated with the TiN film in accordance with the structure being closer to the high speed side. The same can be said for the COMP side in Table 2. In this case, in the present test, since the friction is measured by applying the side force to the cylinder tube 11, the friction of the structure coated with the TiN film becomes greater than the structure coated with the DLC film 3 in the low speed operation range equal to or less than 0.1 m/sec. However, since no side force is applied in the low speed operation range, where the hydraulic shock absorber 10 is actually mounted on the vehicle, it is possible to disregard the friction in the low speed operation range. In the low speed operation range, since the friction generated in the oil seal 22 is larger than the friction generated in the guide bush 21 as mentioned above, the friction of the slide pipe 12 coated with the TiN film reads a value smaller than the slide pipe 12 coated with the DLC film 3, as shown by the results of the oil seal friction test in the item (A) mentioned above.

Therefore, in accordance with the results of FIGS. 9A and 9B, Tables 1 and 2, and FIGS. 13A and 13B, in the hydraulic shock absorber 10, in the high speed operation range equal to or more than 0.1 m/sec, the slide pipe 12 coated with the DLC film 3 has less friction than the slide pipe 12 coated with the TiN film. During high speed operation time, the slide pipe 12 coated with the DLC film better moves than the slide pipe 12 coated with the TiN film. It is considered that this is because the surface roughness of the DLC film 3 is significantly smaller than the surface roughness of the TiN film.

(C) Stroke Test

Figure 10:
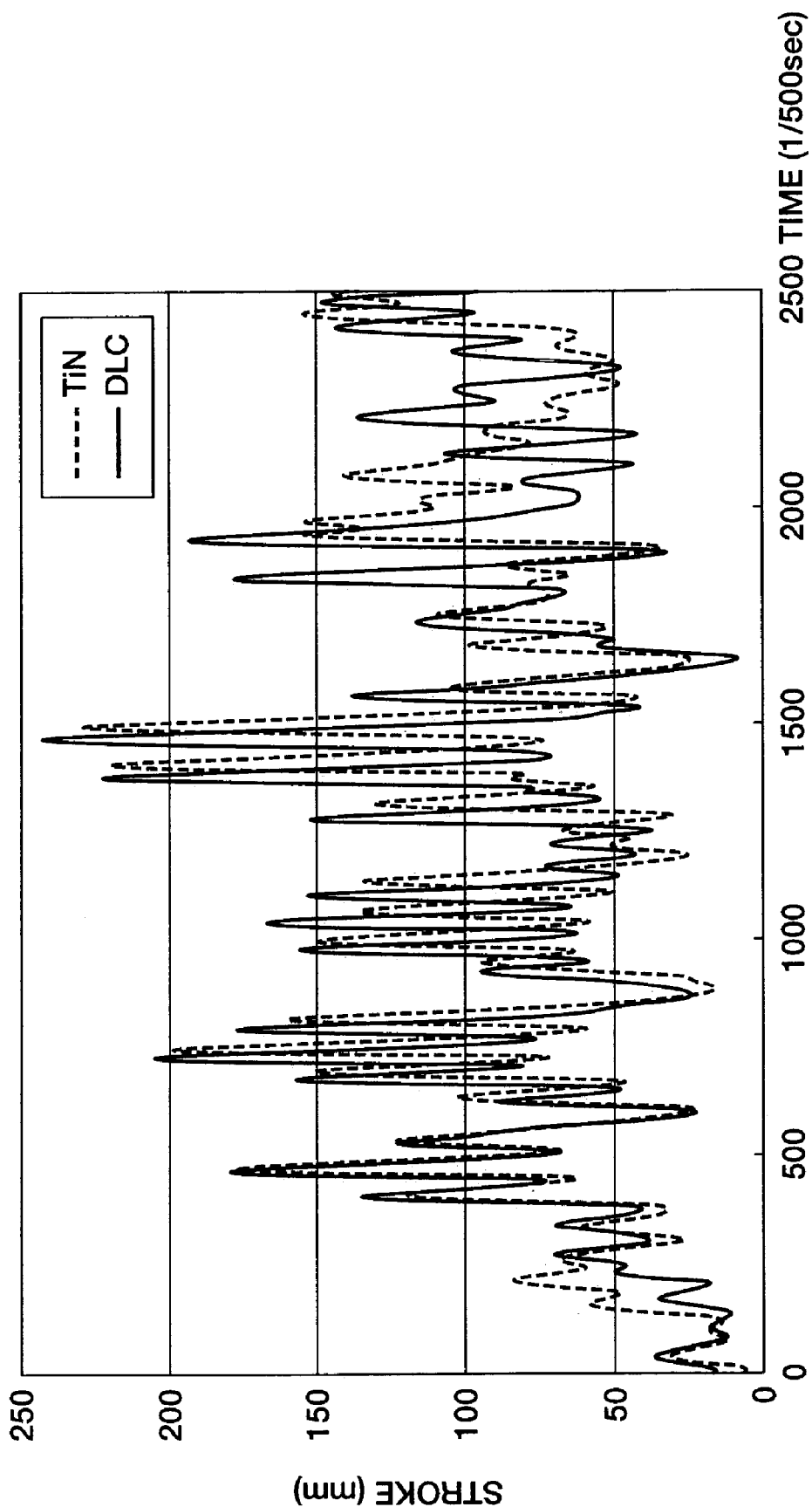
FIG. 10 is a diagram showing a stroke amount of a front fork.

FIG. 10 shows results obtained by measuring a stroke amount of the hydraulic shock absorber 10 at a time of traveling on a rough road surface having large irregularity. In this stroke test, a displacement meter (a potentiometer) is mounted between the cylinder tube 11 and the slide pipe 12 of the hydraulic shock absorber 10 mounted on a motocross bike. The potentiometer measures a relative change amount between those elements at a time of traveling on the road surface having the large irregularity at a high speed, and this relative change amount is set to the stroke amount.

As shown in the results in FIG. 10, the stroke amount is slightly more in the hydraulic shock absorber 10 in which the DLC film 3 is coated on the slide pipe 12 than that in which the TiN film is coated thereon, and the stroke is deeper, so that the road surface following property is improved. The results in FIG. 10 coincide with the results of the guide bush friction test in the item (B) mentioned above.

Figure 11:
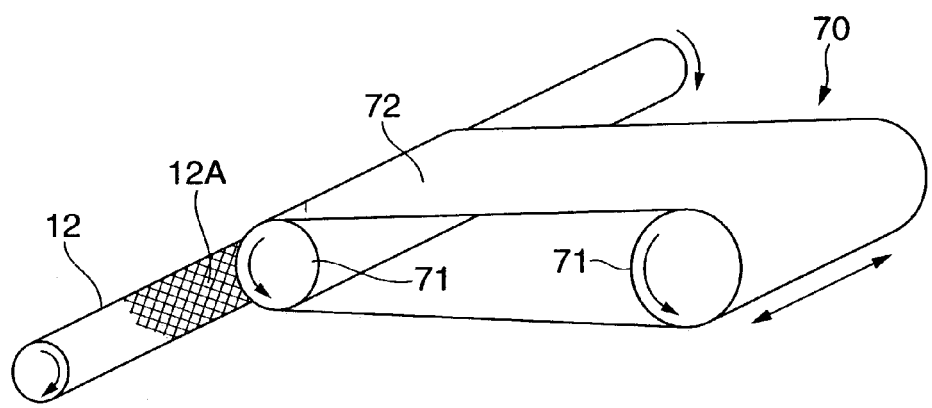
FIG. 11 is a view showing a net-shape groove forming apparatus.

Next, grooves 12A having a fine depth and holding the working fluid are formed on the surface of the DLC film 3 coated on the slide pipe 12 so as to be formed in a net shape, by using a net-shape groove forming apparatus (a super finisher S/F) 70 shown in FIG. 11. Therefore, it is possible to form an oil film holding surface for the working fluid on the surface of the slide pipe 12. The depth of the groove 12A is preferably set to 0.09 to 0.2 $\mu$m.

The net-shape groove forming apparatus 70 is structured such that an abrasive cloth and paper 72 is wound around a pair of wrapping shafts 71 and 71. The net-shape groove forming apparatus 70 moves laterally while pressure contacting the abrasive cloth and paper 72 with the slide pipe 12 in an orbiting state. In the present embodiment, after a rough grinding is carried out by the abrasive cloth and paper 72 of abrasive grain having a size of 15 $\mu$m, a finish grinding is carried out by the abrasive cloth and paper 72 of abrasive grain having a size of 9 $\mu$m. It is possible to change the setting of the depth and the width of the groove 12A by changing the size of the abrasive grain in the abrasive cloth and paper 72.

Figure 12:
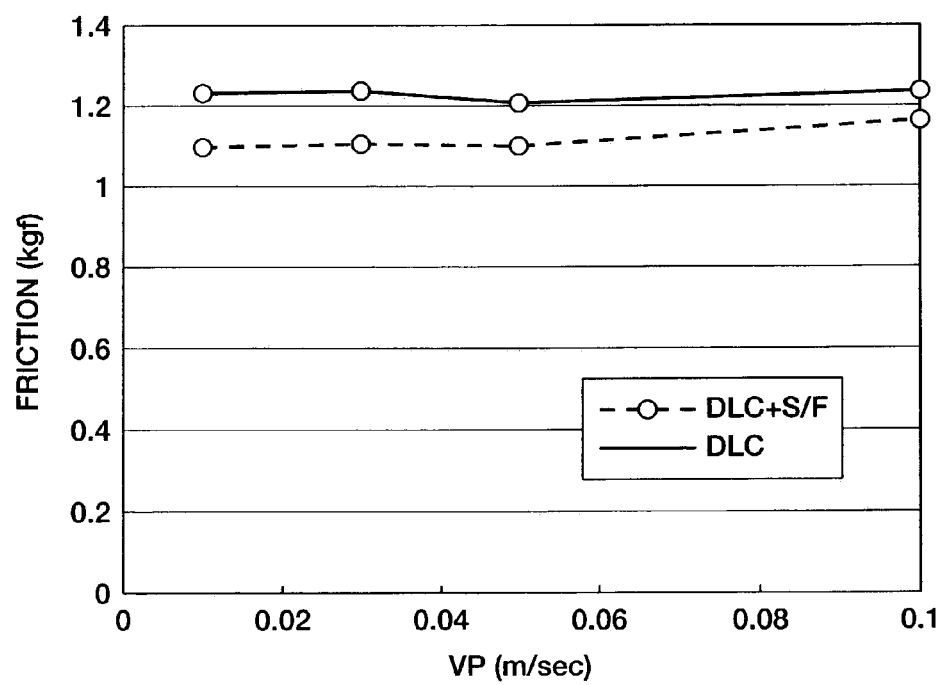
FIG. 12 is a diagram showing the oil seal friction property.

FIG. 12 shows results obtained by measuring friction of a structure in which the net-shaped groove 12A forming the oil film holding surface is applied to the DLC film 3 coated on the slide pipe 12 (DLC+S/F) (a broken line), and a friction of a structure in which the net-shaped groove 12A is not applied (DLC) (a solid line), in accordance with the oil seal friction test using the oil seal friction tester 50 mentioned above. In accordance with the results of FIG. 12, it is possible to reduce the friction in the low speed operation range so as to move in parallel downward as a whole, by forming the net-shaped groove 12A holding the working fluid on the surface of the DLC film 3. Therefore, it is possible to suitably change the friction in the low speed operation range.

In this case, the items (A) to (C) mentioned above only show the test results obtained by comparing the structure in which the DLC film 3 is coated on the slide pipe 12 with the structure in which the TiN film is coated thereon. In this case, even in the case of the slide pipe 12 being coated with the TiO film in place of the TiN film, the same results as those of the slide pipe 12 coated with TiN film are obtained. It is considered that this is because the TiO film has a grain boundary similar to the TiN film.

Thus, in accordance with the present embodiment, the following effects can be obtained.

(1) According to the first aspect, in the hydraulic shock absorber 10, during low speed operation of the slide pipe 12 such as when traveling on a flat straight road surface or the like, it is required that the slide pipe 12 does not move too much and the road holding property or the like is good. Further, during high speed operation of the slide pipe 12 such as when traveling on a rough road surface having a large irregularity or the like, it is required that the slide pipe 12 moves freely and the road surface following property of the tire is good. Accordingly, the friction property of the slide pipe 12 in the hydraulic shock absorber 10 is analyzed as mentioned above, and the following results can be obtained.

(a) Since not so much side force is generated in the hydraulic shock absorber 10 due to the vibration input from the road surface when traveling on a flat straight road surface or the like, friction applied to the slide pipe 12 and generated in the oil seal 22 is larger than the friction generated in the guide bush 21. Then, measuring the friction generated between the slide pipe 12 and the lip 22A of the oil seal 22 during low speed operation of the slide pipe 12, the friction of the slide pipe 12 formed with the DLC film 3 becomes larger than the case formed with the TiN film or the TiO film, as mentioned above. This means that in the hydraulic shock absorber 10 using the slide pipe 12 formed with the DLC film 3, wasteful motion of the slide pipe 12 is reduced, so that the road holding property of the tire is improved and driving stability is improved.

(b) During high speed operation of the slide pipe 12, such as when traveling on a rough road surface or the like having a large irregularity, a large side force is applied to the hydraulic shock absorber 10 on the basis of the great vibration input such as the upthrow from the road surface or the like. In that case, the friction applied to the slide pipe 12 and generated in the guide bush 21 is greater than the friction generated in the oil seal 22. Then, measuring the friction generated between the slide pipe 12 and the guide bush 21 during high speed operation time of the slide pipe 12, the friction of the slide pipe 12 formed with the DLC film 3 becomes smaller than the case formed with the TiN film or the TiO film, as mentioned above. This means that in the hydraulic shock absorber 10 using the slide pipe 12 formed with the DLC film 3, the motion of the slide pipe 12 is improved, so that the road surface following property of the tire is improved.

In this case, the friction property in the items (a) and (b) mentioned above, (the property that the friction is higher in the low speed range and lower in the high speed range than the structure having the TiN film or the TiO film), is a significant effect only obtained by the combination among the slide pipe 12 formed with the DLC 3, the guide bush 21 coated with the polytetrafluoroethylene, the oil seal 22 and the working fluid which is peculiar to the hydraulic shock absorber 10 for a vehicle.

(2) According to the second and third aspects, the friction in the low speed range of the slide pipe 12 can be reduced by forming the net-shaped groove 12A holding the working fluid on the surface of the DLC film 3. Further, the friction in the low speed operation range can be changed by suitably changing the depth of the groove 12A or the like. Accordingly, it is possible to change the friction property of the slide pipe 12 in the low speed operation range, and it is possible to respond to the various required properties of the various hydraulic shock absorbers for a vehicle.

In this case, in the embodiment mentioned above, in order to improve the adhesion with the slide pipe raw pipe 1, the intermediate layer 2 made of SiC containing 30 at % or more Si is provided, and the DLC film 3 containing 5 at % Si is formed on the intermediate layer 2. However, the intermediate layer 2 is not particularly required, and Si contained in the DLC film 3 for lowering the internal stress is not essential.

Further, in the embodiment mentioned above, the slide pipe of the front fork is applied as the slide member in accordance with the present invention. However, it is possible to employ the piston rod slidably provided within the damper cylinder installed in the front fork, or the piston rod slidably provided within the cylinder tube of the rear damper as the slide member in accordance with the present invention, and the amorphous hard carbon film may be formed on an outer peripheral surface thereof. Further, the amorphous hard carbon film may be formed on an inner peripheral surface of the cylinder tube.

Further, in the embodiment mentioned above, there is shown the operation and effect in the case that the amorphous hard carbon film is formed on the outer peripheral surface of the slide member in the hydraulic shock absorber. However, it is considered that the same operation and effect can be obtained in the case that the other amorphous films than the amorphous hard carbon film are formed on the slide member.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

As mentioned above, in accordance with the present invention, in the hydraulic shock absorber for a vehicle, it is possible to improve the road holding property during low speed operation, and it is possible to improve the road surface following properties during high speed operation.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A front fork for a motorcycle, comprising:
   a slide pipe slidably provided within a cylinder tube; and
   a working fluid chamber provided within the cylinder tube and the slide pipe, wherein
   upper and lower guide bushes coated with a polytetrafluoroethylene and an oil seal sealing the fluid chamber disposed in an inner periphery of the cylinder tube so as to be in slide contact with an outer peripheral surface of the slide pipe, and
   an amorphous hard carbon film disposed on the outer peripheral surface of the slide pipe,
   wherein grooves having a fine depth and holding the working fluid are formed on a surface of the amorphous hard carbon film.

2. The front fork for a motorcycle according to claim 1, wherein the grooves have a depth between 0.09 and 0.2 $\mu$m.

3. The front fork for a motorcycle according to claim 2, wherein grooves having a fine depth and holding the working fluid are formed in a net shape on a surface of the amorphous hard carbon film.

4. The front fork for a motorcycle according to claim 3, wherein the grooves have a depth between 0.09 and 0.2 $\mu$m.

5. The front fork for a motorcycle according to claim 1, wherein an average roughness of the amorphous hard carbon film surface formed on the outer peripheral surface of the slide pipe is Ra=7.3 Å.

6. The front fork for a motorcycle according to claim 1, wherein the low speed operation range is from 0.01 m/sec to 0.1 m/sec and the high speed operation rage is more than 0.1 m/sec.

* * * * *